(12) United States Patent
Roy et al.

(10) Patent No.: US 10,104,177 B2
(45) Date of Patent: Oct. 16, 2018

(54) DISTRIBUTED GATEWAYS WITH CENTRALIZED DATA CENTER FOR HIGH THROUGHPUT SATELLITE (HTS) SPOT BEAM NETWORK

(71) Applicant: HUGHES NETWORK SYSTEMS. LLC, Germantown, MD (US)

(72) Inventors: Satyajit Roy, Germantown, MD (US); Archana Gharpuray, Germantown, MD (US); Hanny Kadrichu, Germantown, MD (US); Amit Arora, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 167 days.

(21) Appl. No.: 15/282,876

(22) Filed: Sep. 30, 2016

(65) Prior Publication Data
US 2018/0097888 A1   Apr. 5, 2018

(51) Int. Cl.
| | |
|---|---|
| G06F 15/173 | (2006.01) |
| G06F 15/16 | (2006.01) |
| H04L 29/08 | (2006.01) |
| H04L 12/24 | (2006.01) |
| H04L 12/26 | (2006.01) |
| H04L 12/46 | (2006.01) |
| H04L 12/851 | (2013.01) |

(52) U.S. Cl.
CPC .......... *H04L 67/14* (2013.01); *H04L 12/4633* (2013.01); *H04L 41/0803* (2013.01); *H04L 43/028* (2013.01); *H04L 47/24* (2013.01); *H04L 67/02* (2013.01)

(58) Field of Classification Search
CPC . H04L 67/14; H04L 12/4633; H04L 41/0803; H04L 43/028; H04L 47/24; H04L 67/02
USPC .......................................................... 709/203
See application file for complete search history.

(56) References Cited

U.S. PATENT DOCUMENTS

| | | | | |
|---|---|---|---|---|
| 7,299,294 B1 * | 11/2007 | Bruck | ............... | H04L 29/12216 709/201 |
| 9,660,905 B2 * | 5/2017 | Dunbar | ................... | H04L 45/44 |
| 9,706,466 B2 * | 7/2017 | Zhang | ................... | H04W 36/24 |
| 9,900,801 B2 * | 2/2018 | Papa | ................. | H04W 28/0289 |
| 9,930,603 B2 * | 3/2018 | Dinan | ................... | H04W 40/02 |
| 9,942,938 B2 * | 4/2018 | Pragada | ................ | H04W 76/22 |

(Continued)

*Primary Examiner* — Melvin H Pollack
(74) *Attorney, Agent, or Firm* — Nath, Goldberg & Meyer; Leonid D. Thenor

(57) ABSTRACT

A system is disclosed for centralizing common gateway operations in a satellite communication system. One or more distributed GWs establish a first Layer-3 connection to the plurality of terminals over a satellite network. A second Layer-3 connection is established between a data center and the distributed GWs over backhaul network. A network management system is provided for managing access to the external networks by the plurality of terminals. The system also includes a deep packet inspection unit, within the data center, for inspecting all traffic between the plurality of terminals and the external networks. The data center establishes a connection with external networks, and enable communication between the plurality of terminals and the external private networks. Multiple data centers can be used to balance traffic load, and to provide system redundancy.

20 Claims, 11 Drawing Sheets

(56) References Cited

U.S. PATENT DOCUMENTS

| | | | |
|---|---|---|---|
| 9,954,861 B2* | 4/2018 | Fargano | H04L 63/10 |
| 9,955,364 B2* | 4/2018 | Fox | H04W 24/02 |
| 9,973,961 B2* | 5/2018 | Andreasen | H04W 28/0226 |
| 9,980,175 B2* | 5/2018 | Lee | H04W 28/08 |
| 9,980,312 B2* | 5/2018 | Park | H04W 76/20 |
| 2010/0189117 A1* | 7/2010 | Gowda | H04L 12/66 370/401 |
| 2013/0230021 A1* | 9/2013 | Zuniga | H04W 8/087 370/331 |
| 2015/0052234 A1* | 2/2015 | Hahn | H04L 61/6013 709/223 |
| 2015/0256247 A1* | 9/2015 | Haley | H04B 7/185 455/12.1 |
| 2017/0142613 A1* | 5/2017 | Singh | H04W 28/08 |
| 2018/0063087 A1* | 3/2018 | Hira | H04L 63/0263 |
| 2018/0063193 A1* | 3/2018 | Chandrashekhar | H04L 63/20 |
| 2018/0063848 A1* | 3/2018 | Ashrafi | H04W 72/08 |
| 2018/0084544 A1* | 3/2018 | Xu | H04W 76/18 |
| 2018/0092000 A1* | 3/2018 | Kim | H04W 28/08 |
| 2018/0124829 A1* | 5/2018 | Lee | H04W 74/085 |
| 2018/0131572 A1* | 5/2018 | Ansari | H04L 63/10 |
| 2018/0139123 A1* | 5/2018 | Qiang | H04L 45/24 |

\* cited by examiner

| IPv6 | UDP | Encapsulation Header | User IP packet or Control IP packet |
|---|---|---|---|
| Source: N-IPGW WAN or T-IPGW ENT Addr<br><br>Destination: N-IPGW WAN or T-IPGW ENT Addr<br><br>Protocol Number: 17(UDP) | Well known port numbers | Terminal identity, Traffic priority, Protocol Type | (IPv4, IPv6, ROHC or Layer 2) |

DISTRIBUTED GATEWAYS WITH CENTRALIZED DATA CENTER FOR HIGH THROUGHPUT SATELLITE (HTS) SPOT BEAM NETWORK

BACKGROUND INFORMATION

The use of high throughput satellites using spot beam technology has increased greatly as commercial satellite communication systems attempt to address the growing need for content such as video, audio, pictures, etc. Significant increases in capacity have also been achieved through spot beam technology which facilitates implementation of high level frequency reuse across multiple narrowly focused spot beams. As a consequence of the high number of spot beams, however, high throughput satellites have gateways or teleports that are geographically spread over great distances. Each gateway is responsible for provisioning connectivity to public and private networks through an internet service provider (ISP). Additionally, traffic monitoring such as legal intercept functions must be hosted at each gateway or teleport location. There are a number of other common functions that must also be executed at each gateway. All of these functions require complex hardware which increases the cost of operating and maintaining the gateway.

Since gateways are often spread out over great distances, it is often the case that they may be physically located in an area where a high speed ISP connection may not be available. Such gateways must, therefore, utilize slower and sometimes less advanced ISP connections in order to provide access to public and private networks. The slower ISP connections directly affect throughput for consumers, as well as quality of service. Additionally, it may not be possible to take advantage of advanced features of the satellite network if the ISP connection is less advanced and incapable of implementing such features.

As the number of consumers who rely on satellite communication systems continues to increase, service providers must continually expand the capabilities of each gateway in order to maintain acceptable levels of service, while also satisfying consumer desires for increased content. Service providers may also need to deploy additional gateways in order to support increased subscribers. The costs of expanding the number of gateways and the capabilities of each gateway can be very high, because expensive hardware components must be added to maintain similar levels of functionality across all gateways. Based on the foregoing, there is a need for an approach for centralizing common gateway functions at locations capable of supporting high speed ISP connections.

BRIEF SUMMARY

A system and method are disclosed for centralizing common gateway operations in a satellite communication system. According to an embodiment, the system comprises: a plurality of terminals; one or more distributed GWs configured to establish a first Layer-3 connection to the plurality of terminals over a satellite network; a data center; a network management unit, within the data center, for managing access to the external networks by the plurality of terminals; and a deep packet inspection unit, within the data center, for inspecting all traffic between the plurality of terminals and the external networks. The data center is also configured to establish a second Layer-3 connection with the one or more distributed GWs over backhaul network, establish a connection with external networks, and enable communication between the plurality of terminals and the external private networks.

According to another embodiment, the method comprises: establishing a first Layer-3 connection between a plurality of terminals and one or more distributed gateways (GWs) over a satellite network; establishing a second Layer-3 connection between the one or more distributed GWs and a data center over backhaul network; establishing an external connection between the data center and external networks; enabling communication between the plurality of terminals and the external networks along the first Layer-3 connection, the second Layer-3 connection, and the external connection; managing, by the data center, access to the external networks by the plurality of terminals; and inspecting all traffic between the plurality of terminals and the external networks using a deep packet inspection (DPI) unit within the data center.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 4 is a diagram of various fields in a header of data packets transmitted over the Layer-3 connections, according to one embodiment;

DETAILED DESCRIPTION

A system and method for centralizing common gateway operations in a satellite communication system, is described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
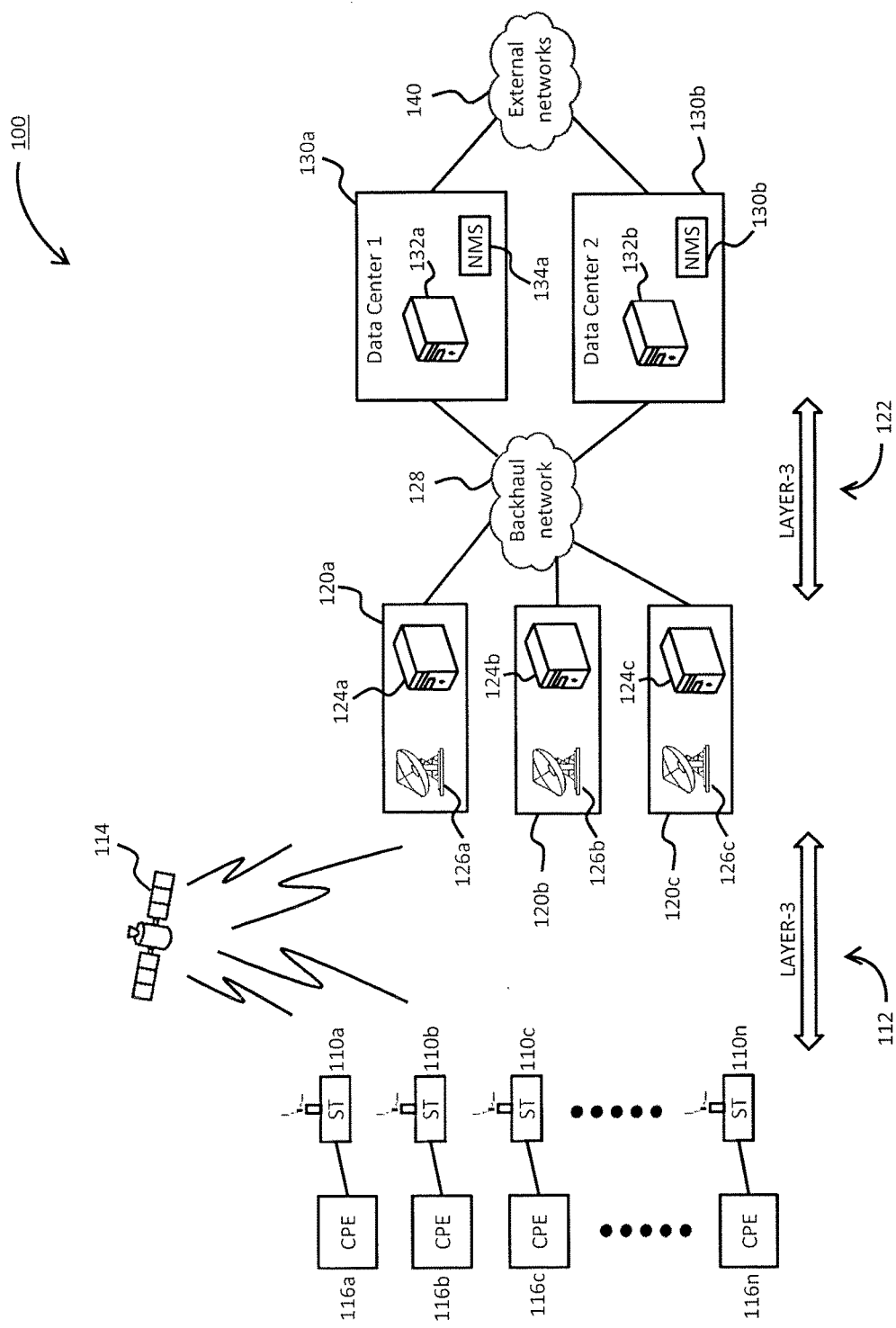
FIG. 1 is a diagram of a system having distributed gateways and centralized data center, according to one embodiment.

FIG. 1 is diagram of a system having distributed gateways and centralized data center, according to one embodiment. The system 100 includes a plurality of very small aperture terminals (VSATs or simply terminals) 110a-110n, a plurality of distributed gateways 120a-120c, and one or more data centers 130a and 130b. The terminals 110 communicate with the gateways 120 using a first Layer-3 connection 112 that is established via a satellite 114. The terminals 110 can be located at various customer locations in order to provide access for different customer premise equipment (CPE) 116 to transmit/receive information to/from the gateways 120. The customer premise equipment 116 can include various devices which can be used by a consumer to communicate and/or access external networks. For example, such customer premise equipment 116 can include computers, laptops, tablets, mobile phones, or any network-enabled device having a wired and/or wireless interface.

As previously discussed, the terminals 110 established a first Layer-3 connection 112 with the gateways 120. Depending on the specific geographic location of the terminal 110, communication will be established with a gateway 120 which is positioned to service a satellite beam encompassing the location of the terminal 110. Each gateway 120 corresponds to a site in a specific geographic location defined by the satellite. The gateway 120 can support multiple antennas and transmitters, as well as cabling to hardware components such as baseband equipment that can be used to control the transmitters and process information being received and transmitted.

According to at least one embodiment, each gateway 120 can include, for example, one or more servers 124 capable of interfacing with appropriate hardware to establish a link to a radio frequency transmitter 126. While FIG. 1 illustrates a single server 124 within the gateways 120, it should be noted that multiple servers can be utilized, depending on the specific implementation. Furthermore, one or more desktop computers (not shown) can be incorporated within the gateway 120. Accordingly, the server 124 illustrated in FIG. 1 is only intended to be representative of different computing systems (desktop computers, laptops, servers, etc.) that can be used to control different operations and devices associated with the gateway 120.

A second Layer-3 connection 122 is established between the gateways 120 and the data centers 130. According to the illustrated embodiment, the second Layer-3 connection can be established over any available backhaul network 128, or networks, required to reach the location of the data center 130. According to various embodiments, the data centers 130 can be located in areas where high speed Internet service providers (ISPs) are available, or areas that are close to the location of high-speed Internet service providers. The high speed ISPs are used to provide access to various external networks 140. The external networks 140 can include public networks (e.g., the internet) or private networks. Each data center 130 can include, for example, one or more servers 132 (or desktop computers, laptops, etc.) and a network management system 134.

According to various embodiments, the data center 130 functions as a centralized connection point for the terminals 110 to access the external networks 140, and deploys all necessary baseband acceleration/compression and networking equipment. According to the illustrated embodiment, the network management system 134 can be co-located with the data center 130. According to other embodiments, the network management system 134 can also be located at a separate site from the data center 130. Regardless of location, each network management system 134 is capable of communicating with all data centers 130 within the system. The data center 130 illustrated in FIG. 1 can be configured to manage and control access of the external networks 140 by all customer premise equipment 116. Additionally, various embodiments provide configurations which allow the data center 130 to centrally perform operations that are often performed at each individual gateway 120.

Figure 2:
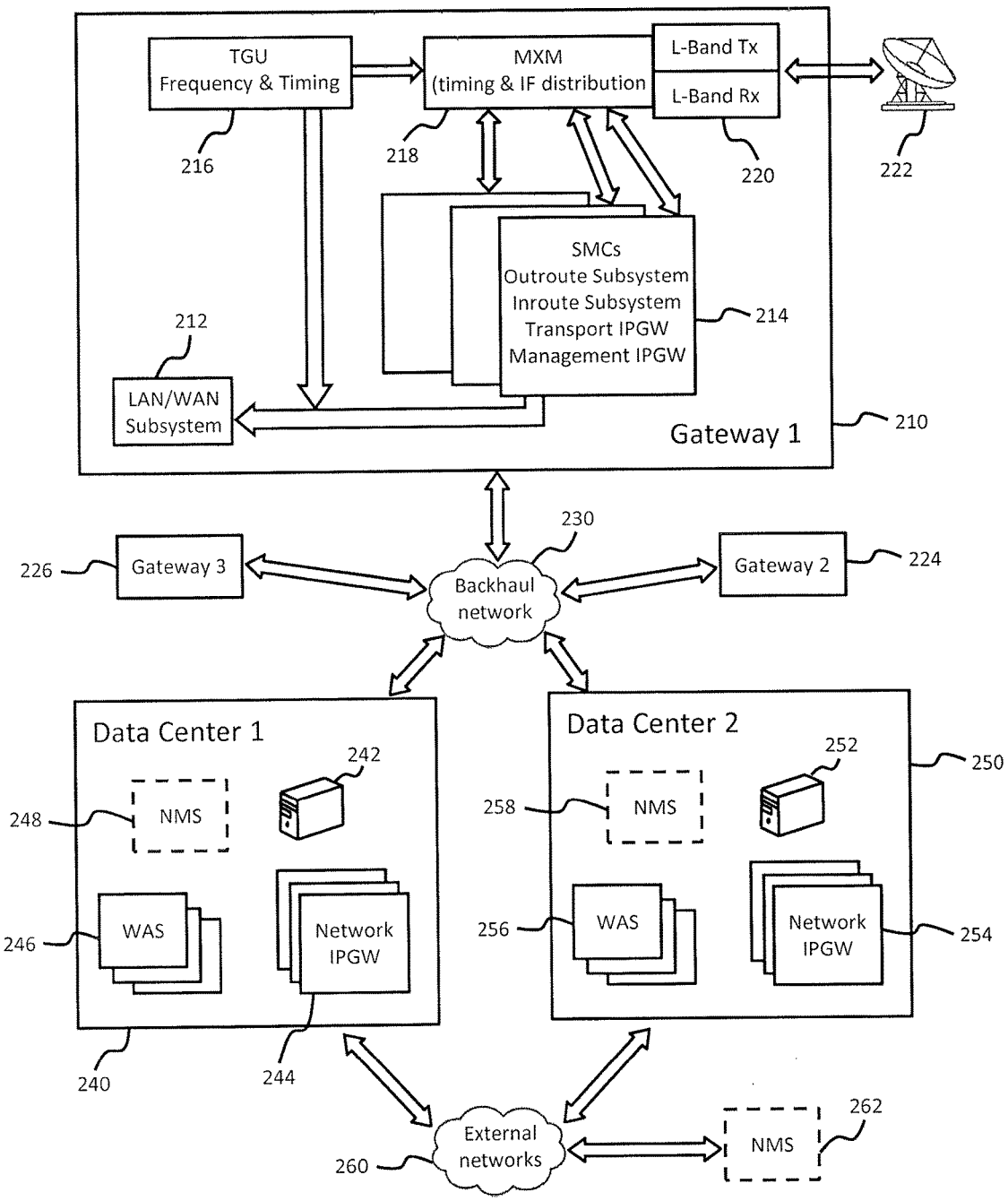
FIG. 2 is a diagram illustrating end to end details of the system shown in FIG. 1, according to one at least one embodiment.

FIG. 2 is a diagram illustrating end to end details of the system shown in FIG. 1, according to at least one embodiment. The system illustrated in FIG. 2 includes three gateways and two data centers which provide customer terminals (not shown) access to external networks 260. The first gateway 210 includes a network subsystem, such as LAN/WAN subsystem 212 that is configured to provide connectivity to local (e.g., within the first gateway) and distant networks (e.g., outside the first gateway). For example, the LAN/WAN subsystem 212 can include multiple ethernet, optical, coaxial, and wireless interfaces which facilitate connectivity to local network devices, as well as external connectivity to a backhaul network 230 over a second Layer-3 connection. The first gateway also includes a plurality of satellite modem clusters (SMC) 214 configured to handle inroute and outroute transport functions. According to at least one embodiment, the satellite modem cluster 214 can include a multi-core server that is paired with an outroute modulator module (OMM) and an inroute demodulator module (IDM) which provide outroute and inroute subsystem operations. For example, the server in the satellite modem cluster 214 can hosts the outroute processor (ORP), inroute processor (IRP) and internet protocol gateway (IPGW) functions. The satellite modem cluster 214 is also configured to host Transport IPGWs and Management IPGWs. The Transport IPGW can be configured to operate as the agent for the Layer-3 Network IPGW 244, 254 at the data centers 240, 250. The Transport IPGW also interfaces with the outroute and inroute subsystems. The management IPGW is configured to manage the paths assigned to terminals for transmitting and receiving information.

The first gateway 210 also includes frequency and timing unit or subsystem 216 in order to precisely generate frequency and system timing references for all elements that are operating within the first gateway 210. A timing and inroute frequency distribution unit 218 is used to provide L-band switching for multiple satellite modem clusters 214. According to at least one embodiment, the timing and inroute frequency distribution unit 218 can include redundant pairs of modem switching matrices which function to provide the necessary L-band switching. The first gateway 210 also includes an L-band transmit and receive unit 220 that processes signals received from, and transmitted to, the radio frequency transmitter 222. According to the embodiment illustrated in FIG. 2, a second gateway 224 and a third gateway 226 are also provided. The second gateway 224 and third gateway 226 are configured in substantially the same manner illustrated as the first gateway 210. It should be noted, however, that additional gateways can also be provided depending on the specific system implementation and requirements. Accordingly, the use of three gateways is only intended to be illustrative, and not restrictive.

According to the illustrated embodiment, two data centers are provided, namely a first data center 240, and a second data center 250. The first data center includes a CPU 242 that can be programmed (or configured) to control various operations in the first data center 240. Alternatively, additional embodiments can allow for the use of multiple servers, desktop computers, laptops, etc. to be used alone, or in combination, for controlling various operations of the first data center 240. According to at least one embodiment, the first data center 240 can include a Network IPGW 244 that performs various processing on traffic which passes through the first data center 240. For example, the Network IPGW can perform functions such as TCP acceleration, header compression, payload compression, etc. The Network IPGW 244, therefore, can include specialized hardware components configured to automatically perform such functions. Additionally, one or more components within the Network IPGW 244 can be operated under the control of the CPU 242. According to one or more embodiments, the first data center 240 can include a plurality of Network IPGWs 244 that function in a cooperative manner to perform all the necessary operations. For example the Network IPGWs 244 can be deployed in pool redundancy modules. Each pool can typically consist of Network IPGWs from both data centers that serve a particular virtual network operation unit within a scope of a particular beam.

The first data center 240 also includes a web acceleration server 246 that can be configured to perform operations such as pre-fetching of HTTP request for web browser traffic. According to at least one embodiment, the first data center 240 can also incorporate multiple web acceleration servers 246 that are configured to perform pre-fetching of HTTP request for web browser traffic from all terminals. According to various embodiments, the first data center 240 can optionally include a co-located network management system 248 that is responsible for managing all aspects of terminals within the system. The network management system 248 can connect to all the data centers within the system, and can manage network layer components in the data centers. The network management system 248 can also connect to all gateways (210, 224, 226) and manage one or more components located within the gateways. Additionally, various embodiments allow for the network management system 248 to manage certain aspects of terminals through their associated gateways.

As illustrated in FIG. 2, the second data center 250 can be configured in the same manner as the first data center 240. For example, the second data center 250 can include a CPU 252, one or more Network IPGWs 254, and one or more web acceleration servers 256, and a network management system 258. According to at least one embodiment, network management system 248 can communicate with network management 258 in order to maintain and synchronize information regarding operations of all components within the system. Such a feature allows the first data center 240 and the second data center 250 to operate in a load sharing and redundancy mode. For example, under normal operating conditions, terminal management and traffic data is balanced between the two data centers. If one of the data centers becomes inoperable, however, the operational data center can perform management functions for the entire system.

While FIG. 2 illustrates an exemplary system that only includes two data centers, it should be noted that various implementations can incorporate additional data centers, as necessary, to optimize costs and speed of the system. Under such configurations, if one data center becomes inoperable, then management of the terminals, gateways, and traffic is redistributed and rebalanced among the operable terminals. For example, if the system includes six data centers, management of terminals, gateways, and traffic is initially distributed and balanced among all six data centers. If the first data center becomes inoperable, then such functions would be redistributed and rebalanced between the second, third, fourth, fifth, and sixth data centers. If the second data center also becomes inoperable, then the functions would be redistributed and rebalanced among third, fourth, fifth, and sixth data centers. As can be appreciated, such features require the network management systems of all data centers to dynamically synchronize traffic and management information.

According to at least one embodiment, an external network management system 262 can be provided at a separate location from any of the first and second data centers 240, 250. According to such embodiments, it is not necessary for the data centers to include co-located network management systems 248, 258. The external network management system 262 can be configured to perform all management functions and supply load balancing and redundancy information to the individual data centers. Thus, if one data center becomes inoperable, the external network management system 262 can provide information to the operational data centers for redistributing and rebalancing traffic within the system.

Figure 3:
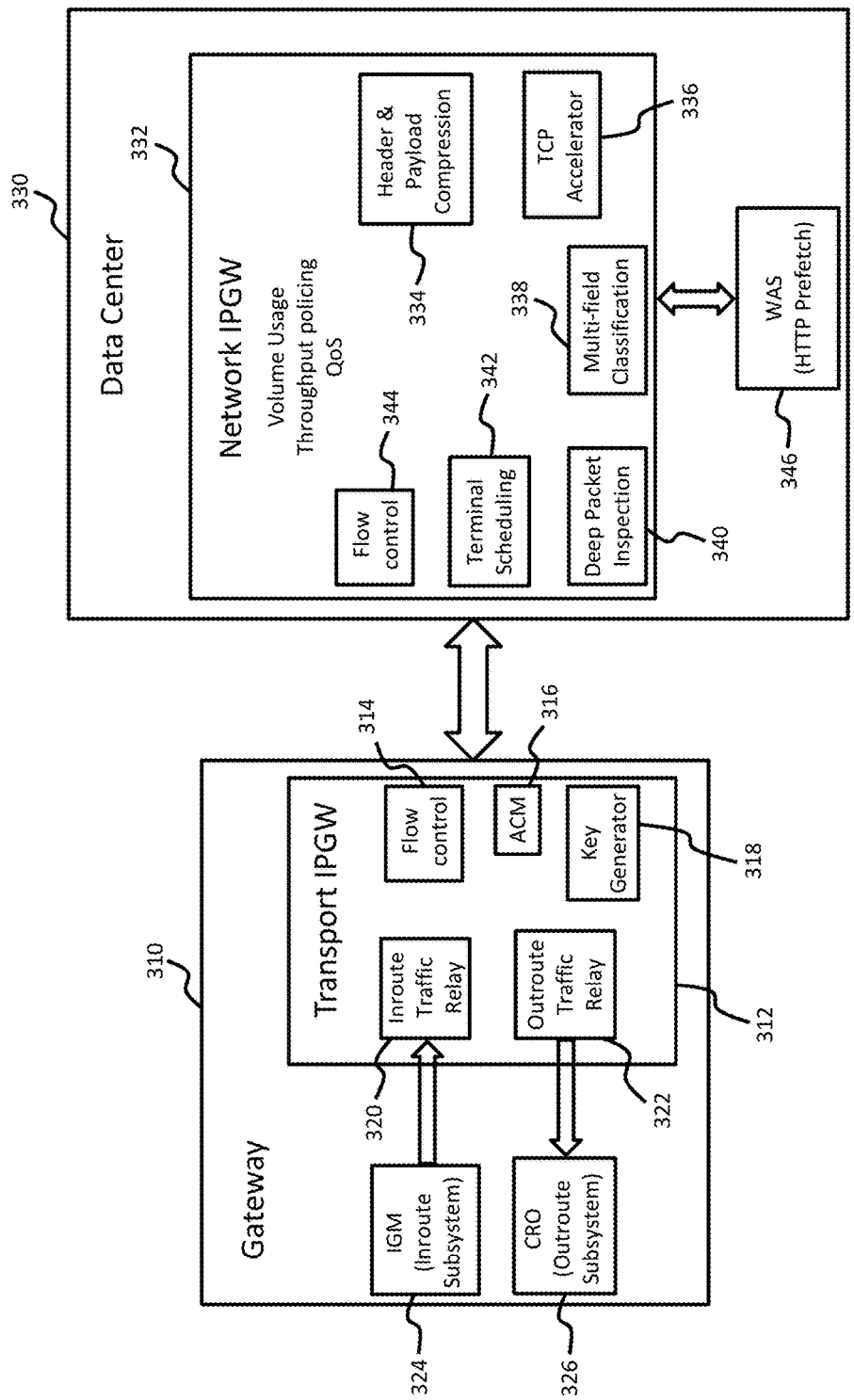
FIG. 3 is a diagram illustrating various details of traffic processing at an exemplary gateway and data center, according to various embodiments.

FIG. 3 is a diagram illustrating various details of traffic processing at a gateway 310 and data center 330, according to various embodiments. The gateway 310 can include a Transport IPGW 312, an inroute group manager 324, and a code rate organizer 326. As previously discussed, the Transport IPGW 312 performs various Layer-3, and interfaces with the inroute group manager 324 and code rate organizer 326. The inroute group manager 324 performs receive processing that includes inroute (return channel) processing and inroute bandwidth allocation. The code rate organizer 326 performs transmit processing that includes outroute (forward channel) processing and system timing synchronization. The code rate organizer 326 can be configured, for example, to determine the modulation and coding to be performed for outroute traffic, and supply coding information to be communicated to the receiver portion of the terminals. The Transport IPGW 312 further includes a flow control unit 314, an adaptive code modulation unit 316, a key generation unit 318, and inroute traffic relay unit 320, and an outroute traffic relay unit 322.

The data center 330 is the centralized connection point to the internet, and deploys all necessary baseband acceleration and networking equipment. According to the embodiment illustrated in FIG. 3, the data center includes a Network IPGW 332 and web acceleration server 346. The Network IPGW 332 includes a header and payload compression unit 334, a TCP acceleration unit 336, a multi-field classification unit 338, a deep packet inspection unit 340, a terminal scheduling unit 342, and a flow control unit.

FIG. 4 is a diagram of various fields in a header 400 of transmitted data packets, according to an embodiment. As previously discussed, traffic between the terminals and gateways is carried over a first Layer-3 network, and traffic between the gateways and data centers is carried over a second Layer-3 network. According to various embodiments, the packets transmitted over these Layer-3 networks are uniquely encapsulated for transport in order to maintain Layer-3 identification. The priority of packets being transmitted over the backhaul network can be conveyed through the flow level field of the outer IP header and is used by the backhaul network. An encapsulation header is added after the UDP header in order to carry terminal identity, protocol type of the original packets carried (e.g., IPv4, IPv6, ROHC compressed, or Layer 2) control traffic, and packet priority. The outer header differentiated services code point (DSCP) marking that is used for traffic quality of service (QoS) within the backhaul network may be different from the priority or class of internal satellite network traffic. The internal satellite network traffic priority is set in the encapsulation header after UDP. The backhaul network uses the DSCP marking in the outer header for prioritization or differentiated handing of packets during the time of congestion.

Figure 5:
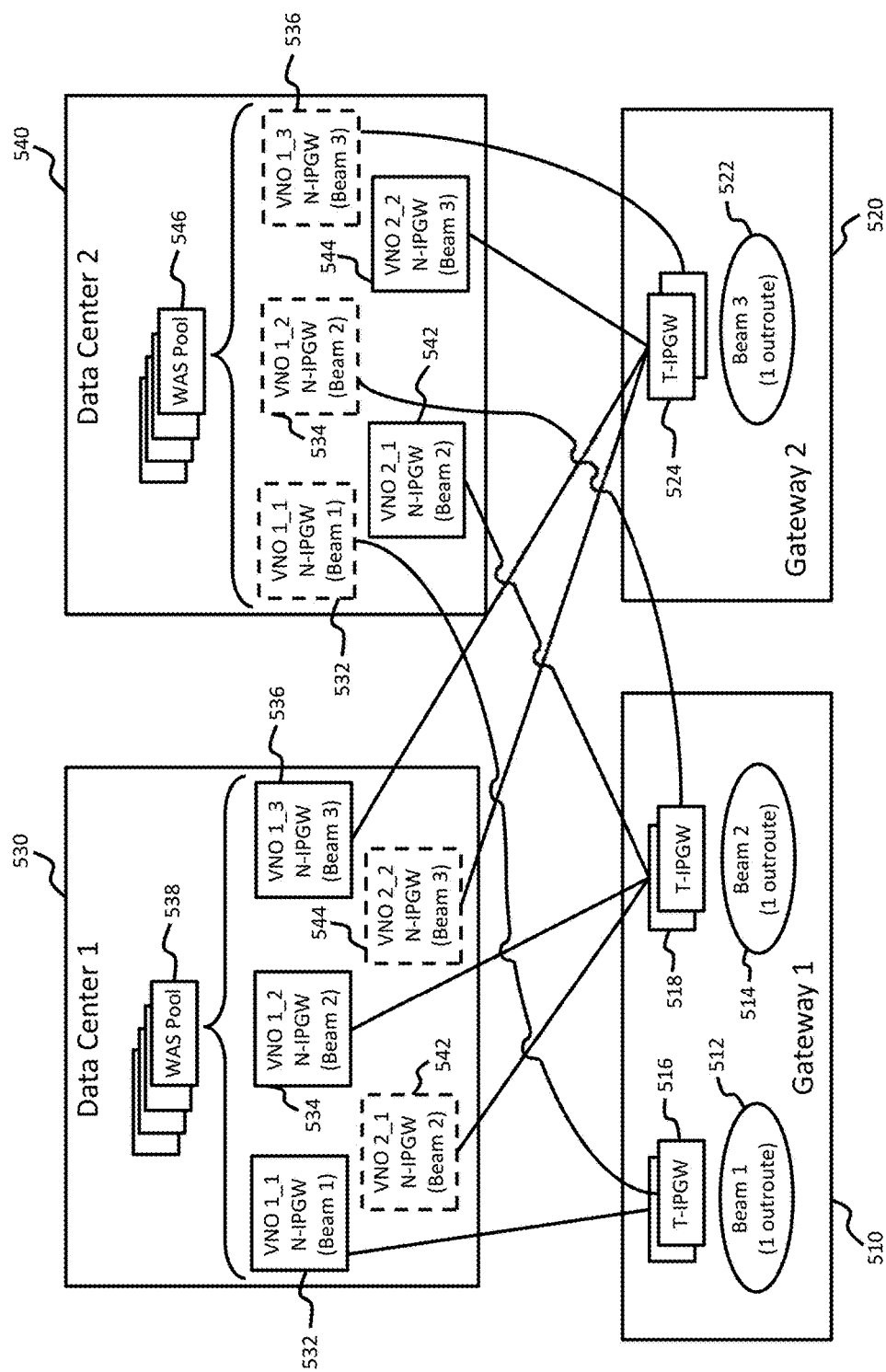
FIG. 5 is a diagram illustrating redundancy and load balancing aspects of data centers, according to one or more embodiments.

FIG. 5 is a diagram illustrating redundancy and load balancing aspects of data centers, according to various embodiments. For simplicity and purposes of explaining various features, the illustrated embodiment only incorporates two gateways (510, 520) and two data centers (530, 540). The first gateway 510 supports a first beam 512 and a second beam 514. The first beam 512 and the second beam 514 each correspond to one outroute within the satellite communication system. According to at least one embodiment, the first gateway 510 can incorporate one or more Transport IPGW's 516 which serve the first beam 512. As previously discussed, a single Transport IPGW 516 can be provided to perform all the necessary functions, or a plurality of Transport IPGW's 516 can be pooled to cooperatively perform all the necessary functions. The first gateway 510 also includes a second Transport IPGW 518 which supports the second beam 514 in a similar manner. The second gateway 520 supports a single outroute on the third beam 522. The second gateway 520 can also include one or more Transport IPGWs 518 to perform operations associated with the third beam 522.

According to the illustrated embodiment, the first data center 530 implements a first virtual network operation (VNO) unit 532, a second virtual network operation (VNO) unit 534, and a third virtual network operation (VNO) unit 536. The first data center 530 can also include a pool of web acceleration servers 538 which perform HTTP prefetch operations for terminals associated with the first VNO unit 532, the second VNO unit 534, and the third VNO unit 536. Depending on the specific implementation, each VNO unit can be implemented on an individual server, or appropriate computer system, that is controlled and managed by the first data center 530. The second data center 540 includes a first VNO unit 542 and a second VNO unit 544. VNO unit 542 supports terminals through Transport IPGW 518 along the second beam 514. VNO unit 544 supports terminals through Transport IPGW 524 along the third beam 522. According to one or more embodiments, the first data center 530 replicates the VNO units of the second data center, and the second data center 540 replicates the VNO units of the first data center 530. Accordingly, the first data center 530 includes a replicated copy of VNO unit 532 and VNO unit 544, both of which are owned by the second data center 540. Similarly, the second data center 540 replicates VNO unit 532, VNO unit 534, and VNO unit 536, all three of which are owned by the first data center 530.

According to one or more embodiments, a terminal belonging to a particular VNO unit can associate with one of the Network IPGWs through the Transport IPGW that serves the terminal's outroute/beam. The selected Network IPGW can be from any of two data centers. The selection process also takes into consideration the load of all Network IPGWs owned by the terminal's VNO unit from both data centers. Such a feature helps to facilitate load balancing of traffic between two data centers. Under normal operating conditions, traffic load and management operations are balanced between the first data center 530 and the second data center 500. Each data center also replicates the virtual network operation units of the other. Such a configuration allows either data center to instantaneously support traffic load and management functions for both data centers if one becomes inoperable.

Figure 6A:
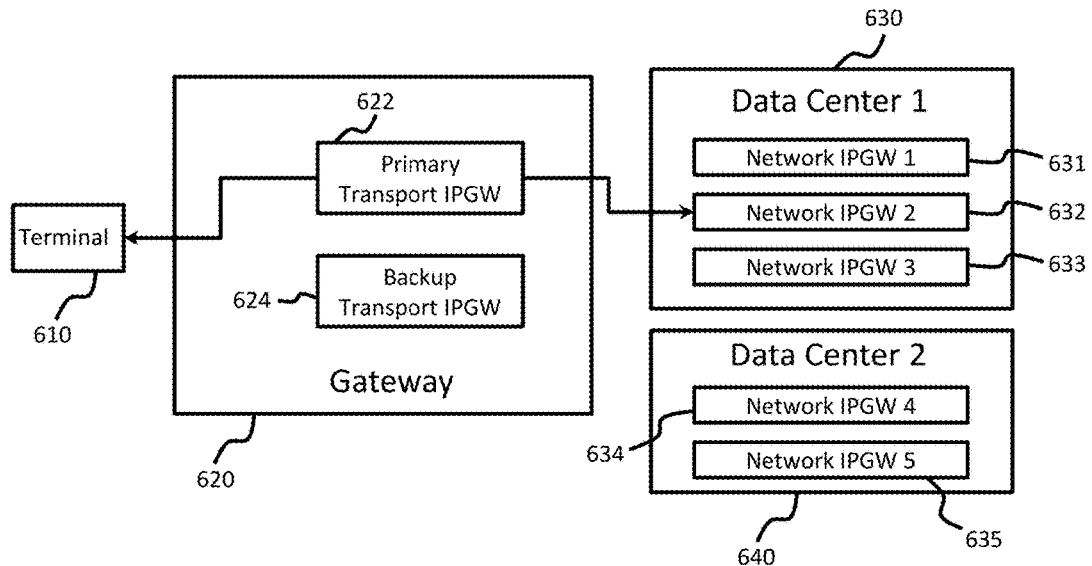
FIGS. 6A and 6B are diagrams illustrating session maintenance, according to at least one embodiment.
Figure 6B:
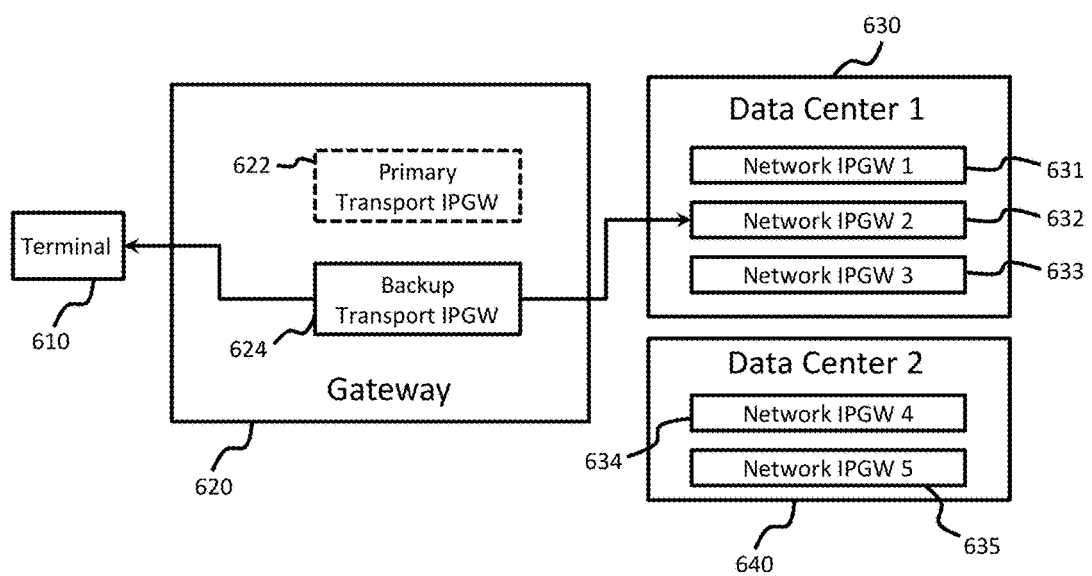

FIGS. 6A and 6B are diagrams illustrating session maintenance, according to an embodiment. A terminal 610 transmits and receives data through a gateway 620. The gateway 620 includes a primary Transport IPGW 622 and a backup Transport IPGW 624. Under normal operating conditions, all traffic through the gateway 620 passes through the primary Transport IPGW 622. However, the backup Transport IPGW 624 maintains session information for all terminals, including terminal 610, supported by the primary Transport IPGW 622 in real time. The system includes a first data center 630 and a second data center 640 which facilitate access to external networks for all of the terminals in the system. The first data center 630 includes a first Network IPGW 631, a second Network IPGW 632, and a third Network IPGW 633. The second data center 640 includes Network IPGW 634 and Network IPGW 635. Initially, the terminal 610 is associated with Network IPGW 632, and currently has active sessions with the external networks through primary Transport IPGW 622.

Referring additionally to FIG. 6B, a situation occurs at the gateway 620, which results in the primary Transport IPGW 622 becoming inoperable. According to the illustrated embodiment, active sessions of the terminal 610 do not end when the primary Transport IPGW 622 becomes inoperable. Rather, the backup Transport IPGW 624 becomes active and takes control of all operations that were being performed by the primary Transport IPGW 622. Thus, all active sessions for the terminal 610 are maintained with Network IPGW 632 through the backup Transport IPGW 624. More particularly, the Transport IPGW 624 maintains information necessary to uniquely identify all TCP connections. Such information can include, for example, sender address, destination address, the session identification, protocol type, etc. According to such features, all end to end TCP connections can be maintained and the network sessions can be transparently continued from the viewpoint of the user.

Figure 7:
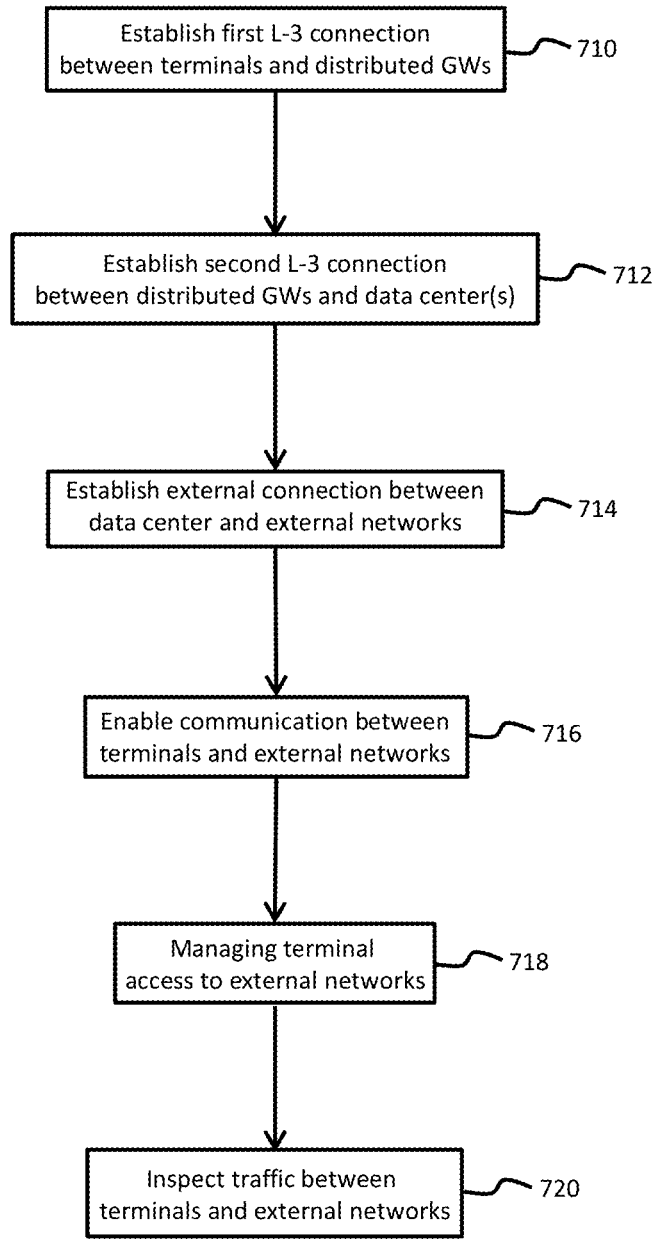
FIG. 7 is a flowchart of a process for operating distributed gateways with a centralized data center, according to one embodiment.

FIG. 7 is a flowchart of a process for operating distributed gateways with a centralized data center, according to an embodiment. At 710, a first Layer-3 connection is established between the terminals and one or more distributed gateways. As previously discussed, the first Layer-3 connection utilizes the satellite network to transmit and receive information. According to one embodiment, the terminals can be configured as VSATs capable of transmitting and receiving information to and from the satellite. Each of the distributed gateways can include a radio frequency transmitter and appropriate hardware and software which also allows the gateway to transmit/receive information to/from the satellite. At 712, a second Layer-3 connection is established between the distributed gateways and the data centers. According to one or more embodiments, the second Layer-3 connection can be established using various hardware such as routers and switches to establish a physical connection. Additionally, any available backhaul network can be used to facilitate the second Layer-3 connection between the gateways and the data centers.

At 714, an external connection is established between the data center and any external networks. The external networks can include any public and/or private networks to which a consumer may require access through one of the terminals. For example, a consumer can utilize the terminal to establish a connection with a network enabled device such as a computer, tablet, mobile phone, etc. According to at least one embodiment, the data center can be physically located in close proximity to a high speed ISP in order to optimize throughput within the system. At 716, communication is enabled between the terminals and the external networks. As previously discussed, the data center includes hardware and software to manage traffic flow between the terminals and the external networks. Additionally, the data center can manage various operations and functions of each gateway as well as each terminal.

At 718, management of access to the external networks by the terminals is initiated. For example, management can include throughput available to a particular terminal based on a subscribed service plan. Additionally, traffic priority can be assigned to different terminals based on the quality of service associated with a particular terminal's subscription plan. At 720, traffic between the terminals and the external networks can be inspected based, at least in part, on management requirements and/or legal requirements. For example, the traffic can be inspected in order to perform functions such as classification, header compression, TCP acceleration, etc. Additionally, law enforcement requests for legal intercepts can be conducted for all terminals from a central location, such as the data center.

Figure 8A:
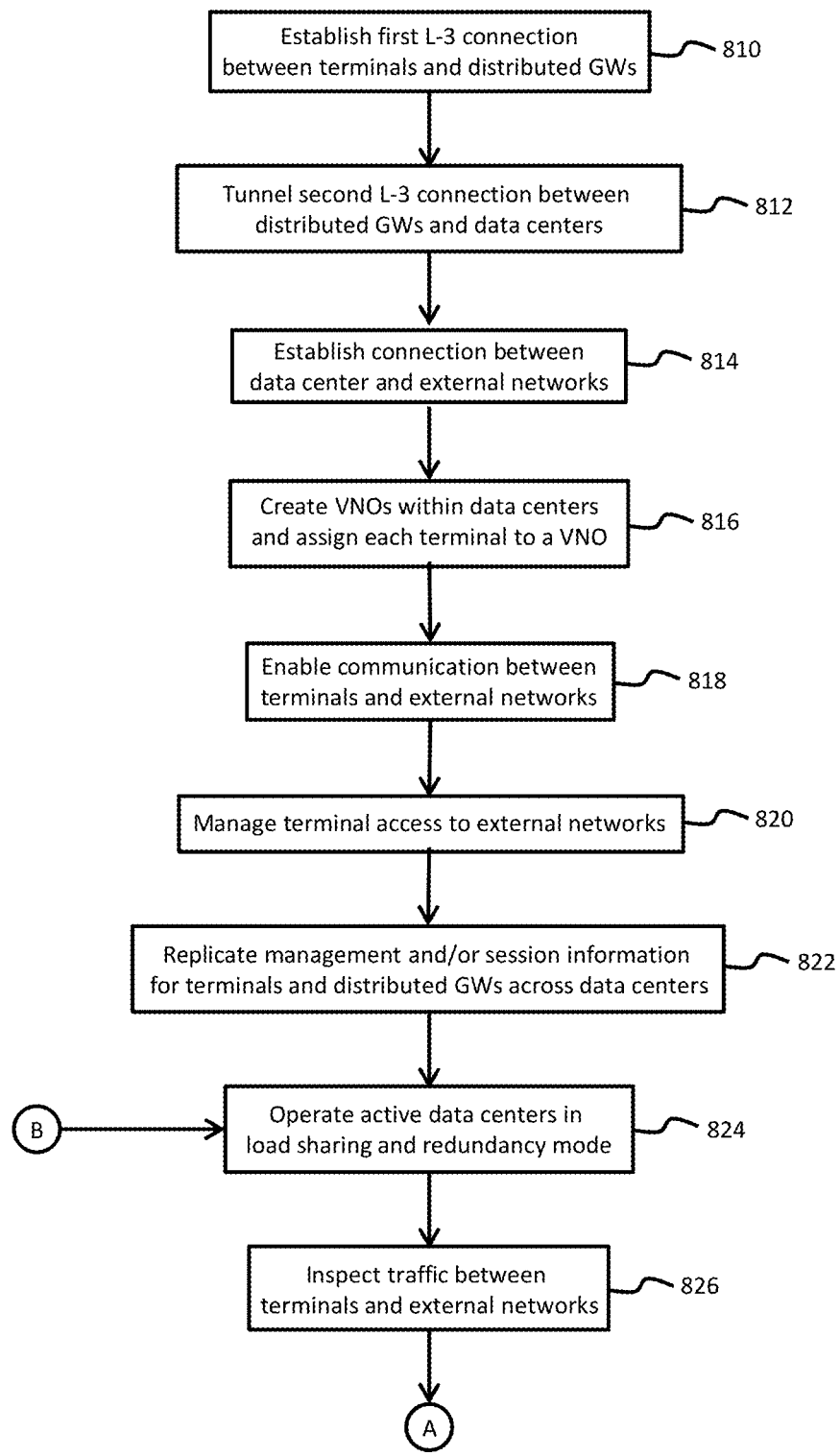
FIGS. 8A and 8B are a flowchart of a process for operating distributed gateways with a centralized data centers, according to various embodiments.
Figure 8B:
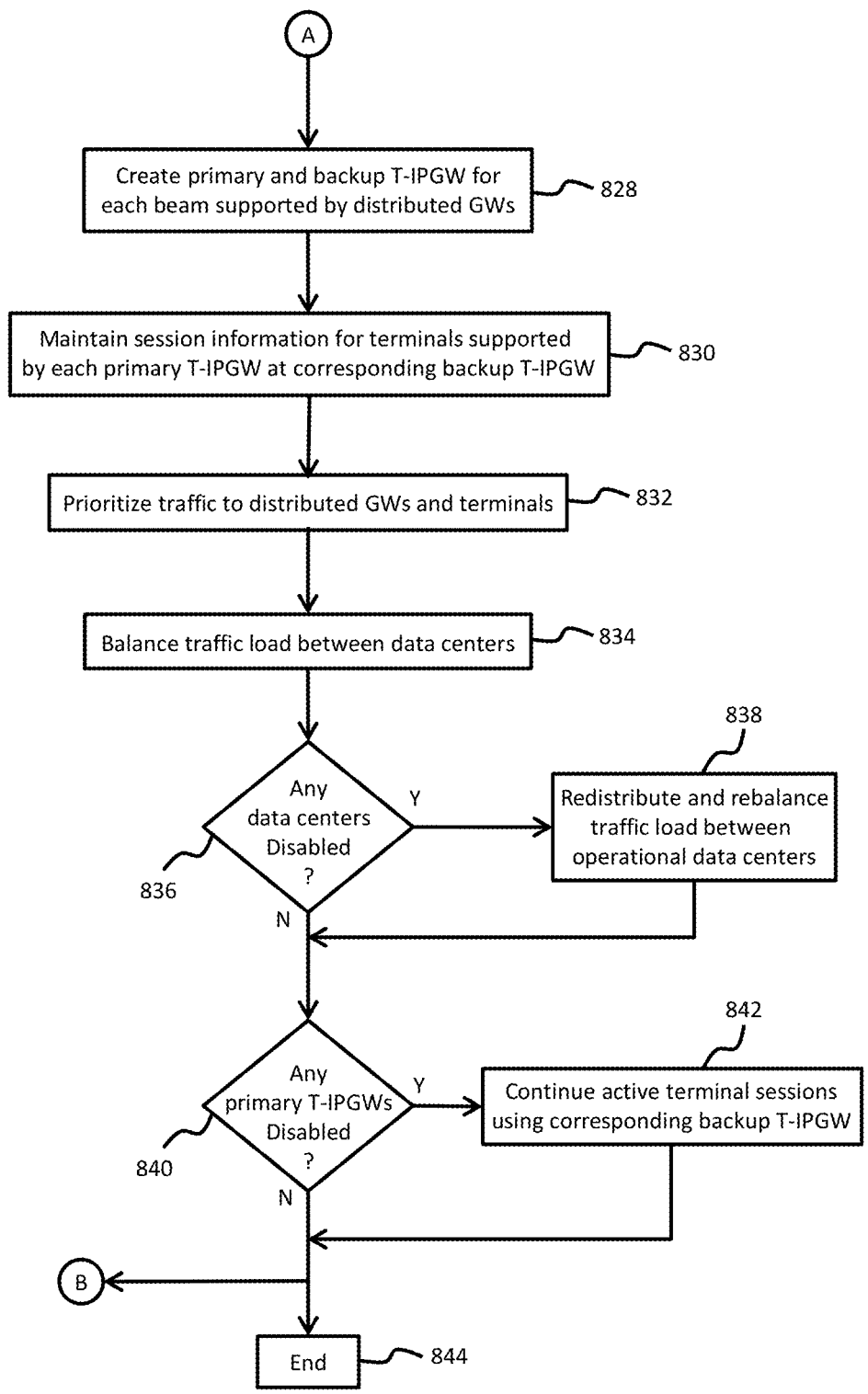

FIGS. 8A and 8B are a flowchart of a process for operating distributed gateways with a centralized data centers, according to various embodiments. At 810, a first Layer-3 connection is established between the terminals and distributed gateways. As previously discussed, the first Layer-3 connection is established via a satellite over an air interface. At 812, a second Layer-3 connection is tunneled between the distributed gateways and the data centers. More particularly, one or more tunneling protocols can be applied to establish a secure connection over the backhaul network. The tunnel can be used to carry system traffic, as well as system control information.

At 816, one or more virtual network operation units are created within the data centers and each terminal within the entire system is assigned to one of the VNO units that has been created. Depending on the specific implementation, only active terminals can be assigned to VNO units. According to one or more embodiments, the virtual network operation units can be operated on individual computers, or multiple virtual network operation units can be created by configuring a computer system or server to perform the operations required by each virtual network operation unit. At 818, communication is enabled between the terminals and the external networks. According to the illustrated embodiment, the terminals utilize the first Layer-3 connection established via the satellite as well as the tunneled Layer-3 connection established between the gateways and the data center.

At 820, terminal access to the external networks is managed. This can be done, for example, through the data center and/or a network management system that is co-located at the data center or externally located. At 822, management and/or session information for all terminals and distributed gateways is replicated across the data centers. According to at least one embodiment, each VNO unit is associated with specific gateways and terminals. Additionally, each data center creates VNO units to manage operation of specific terminals and gateways so that service for all terminals can be achieved through the combined VNO units of each data center. In addition to the VNO units created by a particular data center, VNO units created by all other data centers will be replicated at this particular data center.

At 824, all data centers that are currently active within the system are operated in a load sharing and redundancy mode. More particularly, traffic load and management functions are balanced and distributed among all the data centers. Furthermore, since each data center contains replicated versions of virtual network operation units from all other data centers redundancy can be easily achieved when necessary. At 826, traffic between the terminals and the external networks is inspected. The traffic can be inspected in order determine priority based on different subscriber plans or content type (e.g., system control traffic, voice over IP, web browsing, video/audio streaming, etc.). The traffic can also be inspected in response to a legal intercept that has been requested by appropriate authorities.

At 828, primary and backup Transport IPGWs are created for each beam supported by the distributed gateways. For example, if a particular gateway supports only one beam from the satellite, one primary and one backup Transport IPGW would be created. If the gateway supports three beams from the satellite, then three primary Transport IPGWs would be created along with a backup Transport IPGW for each primary Transport IPGW. At 830, session information for all terminals supported by each primary Transport IPGW is maintained at the corresponding backup Transport IPGW. However, all operations pertaining to these terminals continue to be performed by the primary Transport IPGW. At 832, traffic for the distributed gateways is prioritize as well as traffic for the terminals. At 834, traffic load between the data centers is balanced.

At 836, it is determined whether any of the data centers has become disabled or otherwise inoperable. If a data center is disabled, then the traffic load is redistributed and rebalanced between the operational data centers. According to an embodiment, all terminals and gateways supported by virtual network operation units for the disabled data center are redistributed among the operational data centers. Furthermore, functions that are balanced between the data centers are rebalanced to account for absence of the disabled data center. Control then passes to 840. If none of the data centers have become disabled, control also passes to 840 where it is determined whether any primary Transport IPGWs have become disabled or otherwise inoperable. If any of the primary Transport IPGWs has been disabled, then control passes to 842. All active terminal sessions for the disabled primary Transport IPGW are continued using its corresponding backup Transport IPGW. If no primary Transport IPGWs have been disabled, control passes to 844 where the process can optionally and. As can be appreciated, however, communication within the system can continue for extended periods of time, or even indefinitely. Thus, control can optionally return to 824 where any active data centers continue to be operated in load sharing and redundancy mode.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
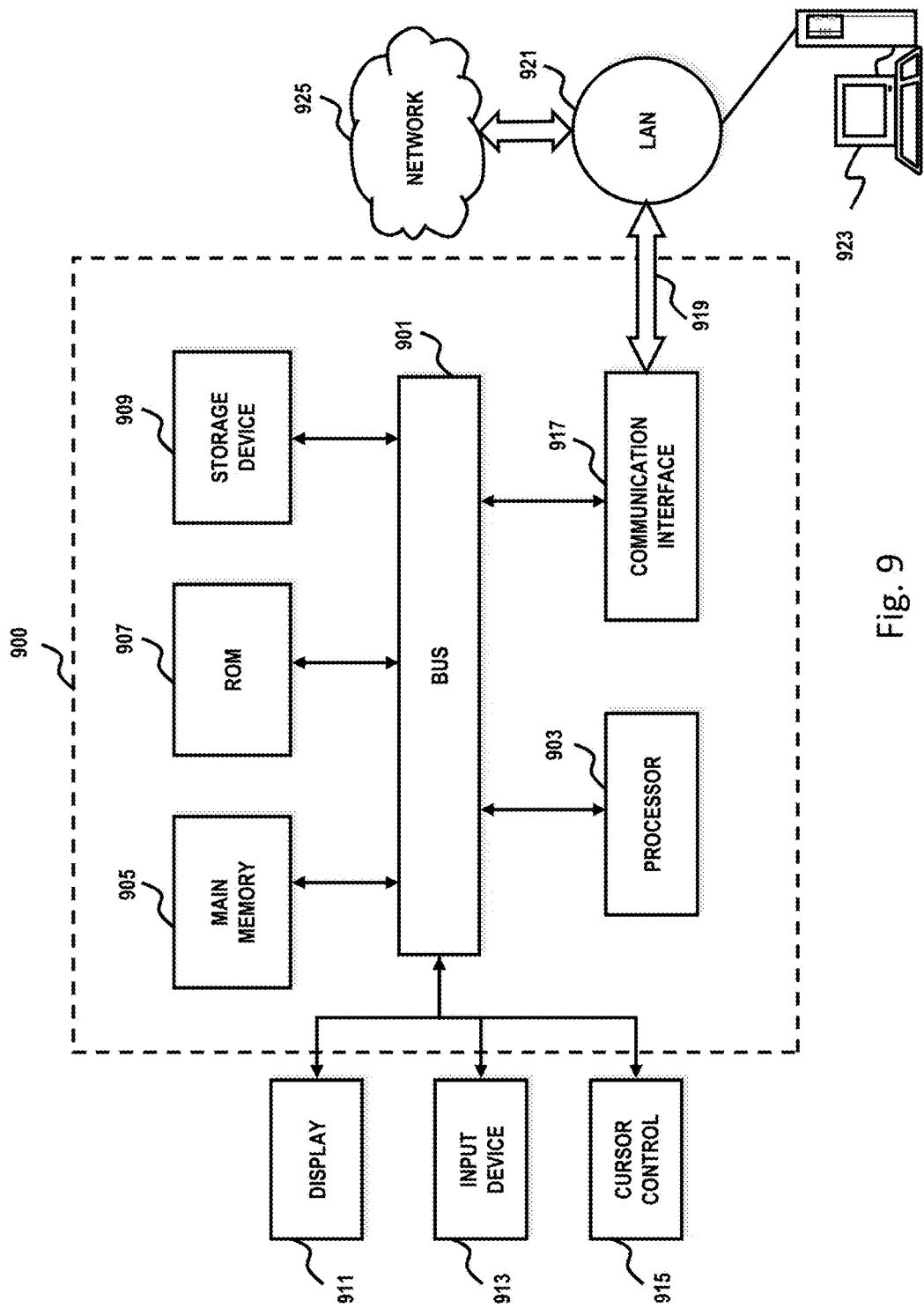
FIG. 9 is a diagram of a computer system that can be used to implement various exemplary embodiments.

FIG. 9 is a diagram of a computer system that can be used to implement various embodiments. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a light emitting diode (LED) or other flat panel displays, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911. Additionally, the display 911 can be touch enabled (i.e., capacitive or resistive) in order facilitate user input via touch or gestures.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a High Definition Multimedia Interface (HDMI), etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 such as a wide area network (WAN) or the Internet. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 1000 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Non-volatile media can further include flash drives, USB drives, microSD cards, etc. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 10:
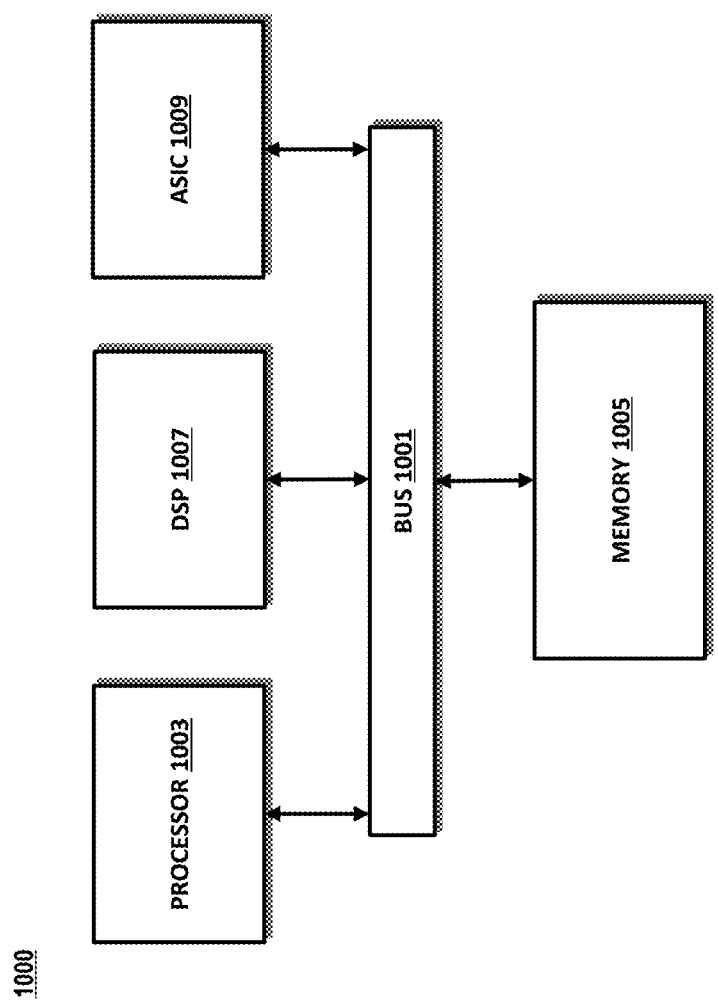
FIG. 10 is a diagram of a chip set that can be used to implement various exemplary embodiments.

FIG. 10 illustrates a chip set 1000 upon which an embodiment of the invention may be implemented. Chip set 1000 is programmed to implement various features as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of the figures.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    establishing a first Layer-3 connection between a plurality of terminals and one or more distributed gateways (GWs) over a satellite network;
    establishing a second Layer-3 connection between the one or more distributed GWs and a data center over a backhaul network;
    establishing an external connection between the data center and external networks;
    enabling communication between the plurality of terminals and the external networks along the first Layer-3 connection, the second Layer-3 connection, and the external connection;
    managing, by a network management system, access to the external networks by the plurality of terminals; and
    inspecting all traffic between the plurality of terminals and the external networks using a deep packet inspection (DPI) unit within the data center.

2. The method of claim 1, further comprising:
    creating one or more virtual network operation (VNO) units within the data center; and
    assigning each terminal to a VNO unit based, at least in part, on outroute beam assignment for the satellite network.

3. The method of claim 1, wherein managing further comprises:
    prioritizing traffic to the one or more distributed GWs based, at least in part, on a subscription plan of terminals serviced by each distributed GW; and
    prioritizing traffic to each terminal based, at least in part, on a differentiated services code point (DSCP) field contained in a layer-2 packet header.

4. The method of claim 1, wherein establishing a second Layer-3 connection further comprises:
    tunneling a connection between the one or more distributed GWs and the data center using the backhaul network;
    transmitting and receiving traffic over the tunneled connection; and
    exchanging, over the tunneled connection, system control information between a transport internet protocol gateway (T-IPGW) within the one or more distributed GWs and a network internet protocol gateway (N-IPGW) within the data center.

5. The method of claim 1, further comprising:
    deploying at least one additional data center at a different location from the data center;
    replicating management and/or session information for the plurality of terminals and the one or more distributed GWs across the data center and the at least one additional data center;
    operating the data center and the least one additional data center in load sharing and redundancy mode; and
    balancing traffic load between the data center and the at least one additional data center.

6. The method of claim 5, further comprising:
    detecting a total or partial failure of any data centers; and
    redistributing and rebalancing traffic load between operational data centers.

7. The method of claim 1, further comprising creating a primary T-IPGW, at each of the one or more distributed GWs, for each supported beam within the satellite network.

8. The method of claim 7, further comprising:
    creating a backup T-IPGW corresponding to the primary T-IPGW at each of the one or more distributed GWs; and
    maintaining session information for terminals supported by each primary T-IPGW at its corresponding backup T-IPGW,
    wherein any active terminal sessions at an inoperable primary T-IPGW are continued at its corresponding backup T-IPGW.

9. The method of claim 1, further comprising performing legal intercept transactions for one or more terminals at the data center.

10. The method of claim 1, further comprising performing, at the data center, traffic optimization including one or more of transmission control protocol (TCP) acceleration, performance enhancing proxy (PEP), payload compression, header compression, and HTTP prefetch.

11. A system comprising:
    a plurality of terminals;
    one or more distributed GWs configured to establish a first Layer-3 connection to the plurality of terminals over a satellite network;
    a data center configured to:
        establish a second Layer-3 connection with the one or more distributed GWs over a backhaul network,
        establish a connection with external networks, and
        enable communication between the plurality of terminals and the external private networks;
    a network management system for managing access to the external networks by the plurality of terminals; and
    a deep packet inspection unit, within the data center, for inspecting all traffic between the plurality of terminals and the external networks.

12. The system of claim 11, wherein the data center is further configured to:

create one or more virtual network operation (VNO) units within the data center; and assigning each terminal to a VNO unit based, at least in part, on outroute beam assignment for the satellite network.

13. The system of claim 11, wherein:
the data center further comprises a multi-field classification unit configured to prioritizing traffic to each terminal based, at least in part, on a differentiated services code point (DSCP) field contained in a layer-2 packet header; and
the network management system is further configured to prioritize traffic to the one or more distributed GWs based, at least in part, on a subscription plan of terminals serviced by each distributed GW.

14. The system of claim 11, wherein:
each distributed GW includes a T-IPGW;
the data center includes a N-IPGW;
a tunnel connection is established between the T-IPGWs of the one or more distributed GWs and the N-IPGW of the data center over the backhaul network;
traffic to/from the plurality of terminals is transmitted/received over the tunneled connection; and
system control information between the T-IPGWs and the N-IPGW is exchanged over the tunneled connection.

15. The system of claim 11, further comprising:
at least one additional data center disposed in a different location from the data center,
wherein management and/or session information for the plurality of terminals and the one or more distributed GWs are replicated across the data center and the at least one additional data center,
wherein the data center and the least one additional data center are operated in a load sharing and redundancy mode, and
wherein traffic load is balanced between the data center and the at least one additional data center.

16. The system of claim 15, wherein, upon detecting a total or partial failure at any data center, traffic load is redistributed and rebalanced between operational data centers.

17. The system of claim 11, wherein each of the one or more distributed GWs further comprises a primary T-IPGW for each supported beam within the satellite network.

18. The system of claim 17, wherein:
each of the one or more distributed GWs further comprises a backup T-IPGW corresponding to its primary T-IPGW;
session information for terminals supported by each primary T-IPGW is maintained at its corresponding backup T-IPGW; and
any active terminal sessions at an inoperable primary T-IPGW are continued at its corresponding backup T-IPGW.

19. The system of claim 11, wherein the data center is further configured to perform legal intercept transactions for one or more terminals.

20. The system of claim 11, wherein the data center further comprises:
a TCP accelerator for increasing throughput over the first Layer-3 connection and the second Layer-3 connection, and for implementing PEPs;
a compression unit for performing header compression and/or payload compression on packets exchanged through the data center; and
a web acceleration server for prefetching HTTP requests for web browser traffic.

* * * * *